(12) United States Patent
Utecht et al.

(10) Patent No.: US 12,738,735 B2
(45) **Date of Patent: *Sep. 15, 2026**

(54) FAULT CLEARING IN ELECTRICAL SYSTEMS WITH INJECTED SIGNAL

(71) Applicant: Hamilton Sundstrand Corporation, Charlotte, NC (US)

(72) Inventors: Tom A. Utecht, Cherry Valley, IL (US); William S. Heglund, Rockford, IL (US); Michael C. Harke, De Forest, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 198 days.

This patent is subject to a terminal disclaimer.

(21) Appl. No.: 18/405,424

(22) Filed: Jan. 5, 2024

(65) Prior Publication Data

US 2024/0146056 A1 May 2, 2024

Related U.S. Application Data

(63) Continuation-in-part of application No. 17/132,521, filed on Dec. 23, 2020, now Pat. No. 12,081,014.

(51) Int. Cl.
*H02J 3/001* (2026.01)
*H02H 1/00* (2006.01)
(Continued)

(52) U.S. Cl.
CPC ......... *H02J 3/00125* (2020.01); *H02H 1/003* (2013.01); *H02H 7/226* (2013.01); *H02J 3/0012* (2020.01); *H02J 2105/32* (2026.01)

(58) Field of Classification Search
CPC .......... H02H 7/06; H02H 7/062; H02H 7/065; H02H 3/16; H02H 3/162; H02H 3/165;
(Continued)

(56) References Cited

U.S. PATENT DOCUMENTS 5,764,064 A 6/1998 Eriksson et al.
6,366,208 B1 4/2002 Hopkins et al.
(Continued)

FOREIGN PATENT DOCUMENTS

GB 2569185 A 6/2019

OTHER PUBLICATIONS

European Search Report for Application No. 21209581.4, mailed May 13, 2022, 6 pages.

*Primary Examiner* — Nguyen Tran
(74) *Attorney, Agent, or Firm* — CANTOR COLBURN LLP

(57) ABSTRACT

A power supply system to provide power to a load connected between first and second connectors. The system includes a generator that produces an alternating current generator output and a rectifier that receives the alternating current generator output and converts it into a direct current output and provides the direct current (DC) output between the first and second connectors. The system also includes a filter connected to the rectifier and between the connectors and that smooths the DC output. The filter includes a midpoint configured to be connected to ground. The system also includes a fault clearing source connected to the first connector that provides a clearing voltage to the first connector when a ground fault occurs on the first connector.

19 Claims, 10 Drawing Sheets

(51) Int. Cl.
*H02H 7/22* (2006.01)
*H02J 3/0012* (2026.01)
*H02J 105/30* (2026.01)

(58) Field of Classification Search
CPC ........ H02H 3/167; H02H 3/202; G01R 31/50; G01R 31/52; G01R 31/55
See application file for complete search history.

(56) References Cited

U.S. PATENT DOCUMENTS

| | | | |
|---|---|---|---|
| 6,525,914 | B1 | 2/2003 | Legatti |
| 8,149,551 | B2 | 4/2012 | Vedulla et al. |
| 8,531,804 | B2 | 9/2013 | Weems, II et al. |
| 8,564,914 | B2 | 10/2013 | Eisenhauer et al. |
| 8,698,504 | B2 | 4/2014 | Wei et al. |
| 8,830,647 | B2 | 9/2014 | Chen et al. |
| 9,368,957 | B2 | 6/2016 | Prisse et al. |
| 9,612,269 | B2 | 4/2017 | Wei et al. |
| 9,859,085 | B2 | 1/2018 | Rozman et al. |
| 10,243,355 | B2 | 3/2019 | Armstrong et al. |
| 10,569,895 | B2 | 2/2020 | Handy |
| 10,585,134 | B2 | 3/2020 | Kell et al. |
| 10,700,514 | B2 | 6/2020 | Whitehouse et al. |
| 10,965,123 | B1 | 3/2021 | Jia et al. |
| 2007/0086125 | A1 | 4/2007 | Baker |
| 2010/0177452 | A1 | 7/2010 | Wei et al. |
| 2017/0063074 | A1 | 3/2017 | Yasusaka et al. |
| 2019/0079129 | A1 | 3/2019 | Valdes |
| 2019/0184833 | A1 | 6/2019 | Elshaer et al. |
| 2019/0305669 | A1 | 10/2019 | Gupta et al. |
| 2020/0133319 | A1 * | 4/2020 | Loder ................ H02M 7/5387 |
| 2020/0144807 | A1 | 5/2020 | Garrison et al. |
| 2022/0200477 | A1 | 6/2022 | Heglund |
| 2023/0144976 | A1 | 5/2023 | Utecht et al. |
| 2023/0231504 | A1 | 7/2023 | Kaliyannan Eswaran et al. |
| 2023/0234448 | A1 | 7/2023 | Kumar et al. |
| 2024/0204653 | A1 | 6/2024 | Utecht et al. |

* cited by examiner

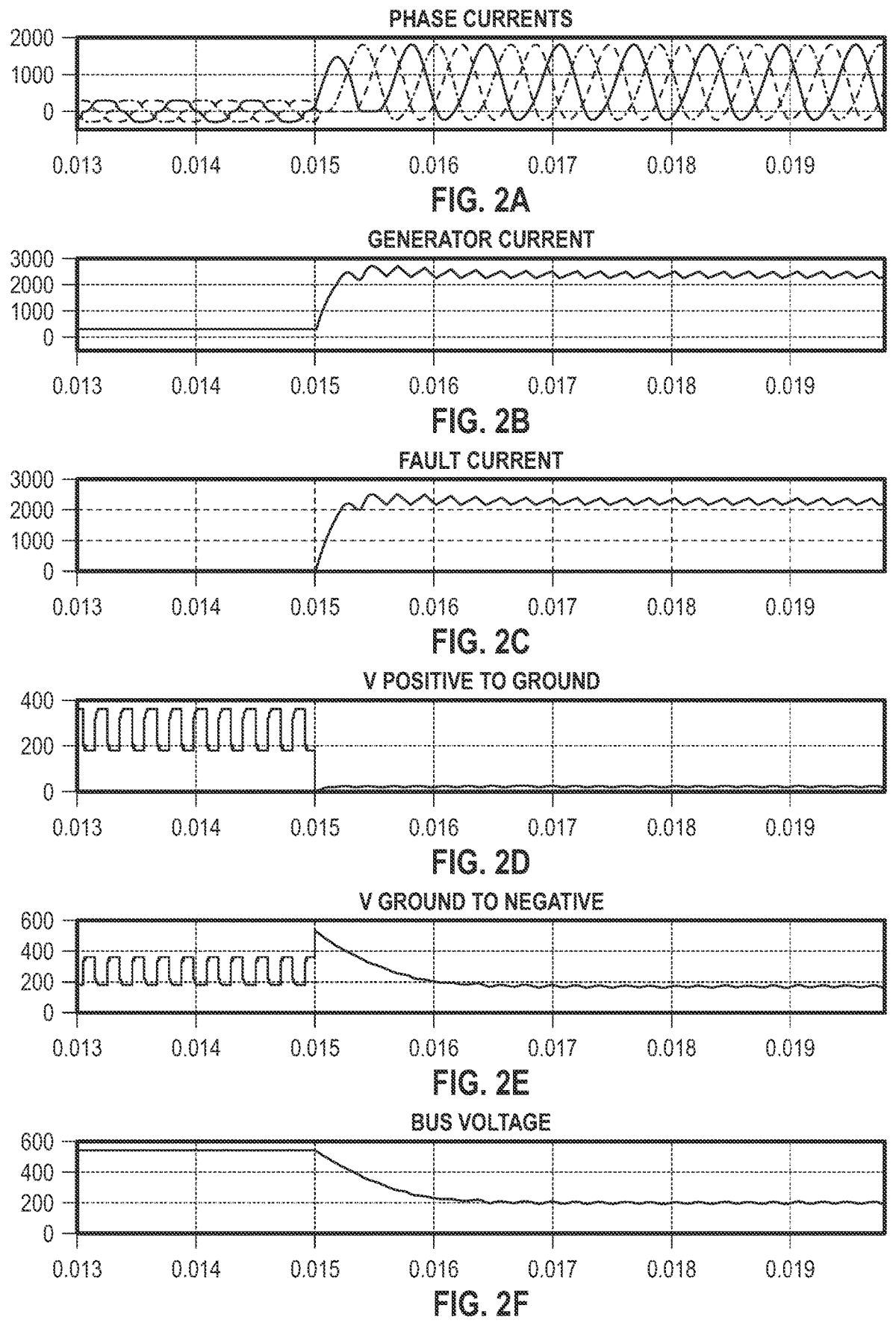

PHASE CURRENTS 2000
1000
0
0.013 0.014 0.015 0.016 0.017 0.018 0.019

FIG. 2A

GENERATOR CURRENT 3000
2000
1000
0
0.013 0.014 0.015 0.016 0.017 0.018 0.019

FIG. 2B

FAULT CURRENT 3000
2000
1000
0
0.013 0.014 0.015 0.016 0.017 0.018 0.019

FIG. 2C

V POSITIVE TO GROUND 400
200
0
0.013 0.014 0.015 0.016 0.017 0.018 0.019

FIG. 2D

V GROUND TO NEGATIVE 600
400
200
0
0.013 0.014 0.015 0.016 0.017 0.018 0.019

FIG. 2E

BUS VOLTAGE 600
400
200
0
0.013 0.014 0.015 0.016 0.017 0.018 0.019

FIG. 2F

PHASE CURRENTS 1000
0
-1000

GENERATOR CURRENT 6000
4000
2000
0
-2000

FAULT CURRENT 6000
4000
2000
0
-2000

V POSITIVE TO GROUND 300
200
100
0

V GROUND TO NEGATIVE 600
400
200
0

BUS VOLTAGE 600
400
200
0

FAULT CLEARING IN ELECTRICAL SYSTEMS WITH INJECTED SIGNAL

CROSS REFERENCE TO RELATED APPLICATION

This application is a Continuation in Part of U.S. patent application Ser. No. 17/132,521, filed Dec. 23, 2020, the disclosure of which is incorporated by reference herein in its entirety.

BACKGROUND

The subject matter disclosed herein generally relates to clearing ground faults and, more particularly, fault clearing for electrical systems that can be employed in airborne applications.

In typical electrical power generation and distribution systems, the protection of the wiring, as well as connected equipment, is needed in the event of a fault such as a ground fault. An aircraft is one illustrative example of an application for such systems.

For aircraft systems, electrical energy is essential for continued flight when relying on electrical flight controls, and is also flight critical for electrically driven hydraulic pumps. Aircraft power systems may use a variety of power characteristics including AC (Alternating Current) or DC (Direct current) systems. Further typical variations of power types may include power sources, loads and distribution of nominal voltages including, but not limited to 28 Vdc, 270 Vdc, or 540 Vdc, 115 Vac, and 230 Vac.

The AC system types may also include Constant Frequency (CF), or Variable Frequency (VF) systems with a wide variation in output current and power ratings. Severe wiring or internal faults within these systems and within power distribution equipment panels or wiring may cause loss of power to these flight critical systems. Protective functions and assemblies within the power distribution systems improve flight safety by preventing or minimizing the effect of system or wiring faults. Rapid detection and isolation, as well as segregation, of ground circuit faults are desirable due to the localized heating and damage that high current or arcs may cause.

BRIEF DESCRIPTION

According to one embodiment, a power supply system to provide power to a load connected between first and second connectors is provided. The system includes: a power source that produces a power output; a power converter that receives the generator output and converts it into a direct current output and provides the direct current (DC) output between the first and second connectors; a filter connected to the rectifier and between the connectors and that smooths the DC output; and a fault clearing source connected to the first connector that provides a clearing voltage to the first connector when a ground fault occurs on the first connector. The clearing voltage includes an identifiable characteristic.

The identifiable characteristic can a frequency, a square wave, a sinusoid, a pulse, or other distinctive and detectable pattern.

In addition to one or more of the features described above, or as an alternative to any of the foregoing embodiments, the fault clearing can be a battery.

In addition to one or more of the features described above, or as an alternative to any of the foregoing embodiments, the fault clearing source receives power from the second connector.

In addition to one or more of the features described above, or as an alternative to any of the foregoing embodiments, the power source is DC source and the power converter is a DC to DC converter.

In addition to one or more of the features described above, or as an alternative to any of the foregoing embodiments, the power source is an AC generator and the power converter is a rectifier that receives the AC power from the generator and converts it into a direct current output and provides the direct current (DC) output between the first and second connectors.

In addition to one or more of the features described above, or as an alternative to any of the foregoing embodiments, the rectifier is a two level active rectifier.

In addition to one or more of the features described above, or as an alternative to any of the foregoing embodiments, the system can further include a contactor/SSPC connected to the first connector that can open and close to clear the fault while the fault clearing source is providing the clearing voltage to the first contactor/SSPC.

In addition to one or more of the features described above, or as an alternative to any of the foregoing embodiments, the fault clearing source is connected between the first connector and a ground.

In addition to one or more of the features described above, or as an alternative to any of the foregoing embodiments, the ground is an airframe ground.

Also disclosed is a power supply system to provide power to a load connected between first and second connectors that in addition to any of the above embodiments includes a second fault clearing source connected to the second connector that provides a second clearing voltage to the second connector when a ground fault occurs on the second connector. In this embodiment, at least of the first and second clearing voltage includes an identifiable characteristic such as those described above.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which:

FIGS. 2A-2F show various currents and voltages in the system of FIG. 1 before and after a ground fault occurs in one of the positive DC connectors of the system;

FIGS. 4A-4F show various currents and voltages in the system of FIG. 3 before and after a ground fault occurs in one of the positive DC connectors of the system if the fault clearing source is not present;

DETAILED DESCRIPTION

Embodiments described herein are directed to a system and method that allows for the provision of current to be used in clearing or otherwise identifying a ground fault in electrical systems. The system includes a current/voltage source that provides the current when one or more connectors or other elements of a DC power supply experiences a ground fault. The current/voltage sources can ramp voltage, can be current limited and/or can inject a time varying signal to clear ground faults.

Figure 1:
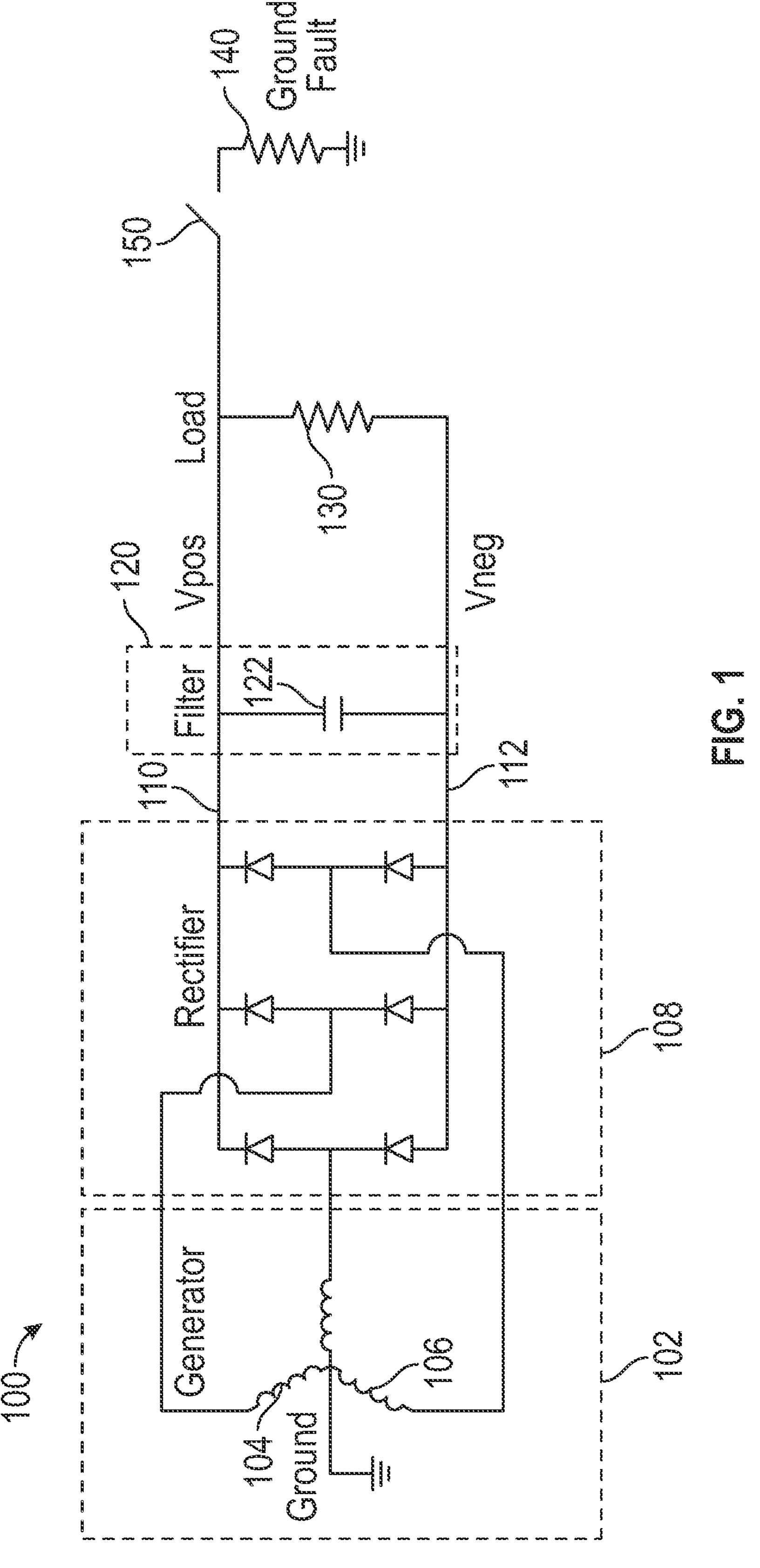
FIG. 1 depicts a system with the generator having its neutral connected to a system ground.

FIG. 1 shows an example of a generator grounded DC power generation system 100. The system 100 includes a power source 102 (illustrated as a neutral grounded generator in FIG. 1 (generally shown as stator coils 104). As shown, the coils 104 are connected to one another at a generator neutral 106. As is common in the art, the generator neutral 106 is connected to ground. It shall be understood, however, that the generator 102 could be replaced with an alternative configuration power source. As such, the dc power source 102 and 108 could be a DC source with a DC to DC converter, a multiphase generator with an appropriate rectifier (e.g., a 12 phase generator with a parallel 12 pulse active rectifier.

The illustrated power source 102 produces three phase AC power and is connected to a passive rectifier 108. The rectifier 108 converts the AC power into DC power. The rectifier 108 is shown as a full wave passive rectifier. A skilled artisan will realize that other types of rectifiers could be utilized in this and other embodiments disclosed herein. For example, the rectifier could be a two level active rectifier.

The output of rectifier 108 can generally be described as a DC output and is presented across positive and negative connections 110, 112. The connections can be cables, rails or other means of carrying high voltage power. In FIG. 1, the voltage on these connections is indicated as Vpos and Vneg, respectively.

In some cases, the output of the rectifier 108 is connected to an output filter 120 to smooth the output of the rectifier 108 to provide a smoothed or otherwise more stable output across positive and negative connections 110, 112. As shown, the filter 120 is implemented by an output (or filter) capacitor 122 is connected across the positive and negative rails 110, 112 but other types of filters are possible.

In normal operation, the smoothed output can be provided to a load 130. However, in some instances such as a fault, one or both of the positive and negative rails 110, 112 can be shorted to ground. That possibility is shown graphically by ground fault connection 140. As shown, the connection is illustrated as resistor, but it can be thought of as short in some instances. Such a fault can occur when, for example, connection 110 has its casing or other production damaged and the currently carrying portion of the connection 110 can be directly connected to ground (e.g., to an airframe of an aircraft). As shown, the fault is occurring on the positive rail but could also or in combination, be on the negative rail as well.

FIGS. 2*a*-2*f* shows several graphs of typical responses of the system of FIG. 1 to a ground fault. Generally, upon sensing the fault, the current to an exciter or other controlling element of the generator is adjusted to reduce the ground fault current.

For amplification, note that the fault is modelled to occur at time 0.015 in FIGS. 2*a*-2*f*. As shown, the generator phase (FIG. 2*a*) and DC (FIG. 2*b*) currents can be very large until the control algorithm adjusts the exciter current to control the ground fault current (FIG. 2*c*). The common mode voltage for this approach can be relatively large. In the example in FIG. 1 the fault is assumed to be in the positive rail 110 so the voltage thereon falls to almost zero (FIG. 2*d*) while the ground to negative rail 110 (FIG. 2*e*) and the negative bus voltage (FIG. 20 collapses to approximately half of the nominal bus voltage for the other loads.

After determining that the fault has occurred, the system 100 can perform a series of tests to determine the location of the fault. In particular, one or more contactors 150 may be opened or closed to determine where along the rails the short has occurred. This determination (or "clearing") requires that current is provided through the rails 110, 112 so that the effect of opening or closing the contactors can be observed. The illustrated contactor 150 is normally closed in normal operation. As shown above, the fact that ground to negative (FIG. 2*e*) can still support a reduced bus voltage (FIG. 20 between the rails 110, 112, there is a source of current to perform those tests.

This approach results in a system that can meet the required DC voltage transient, voltage ripple and voltage distortion requirements. This approach can also provide the necessary DC fault clearing current.

In some cases, it may be preferable to connect a low impedance ground the generator/rectifier to a midpoint of the output filter. Such can exist, for example, in high voltage situations (e.g., 540*v* Line to line voltage systems).

Figure 3:
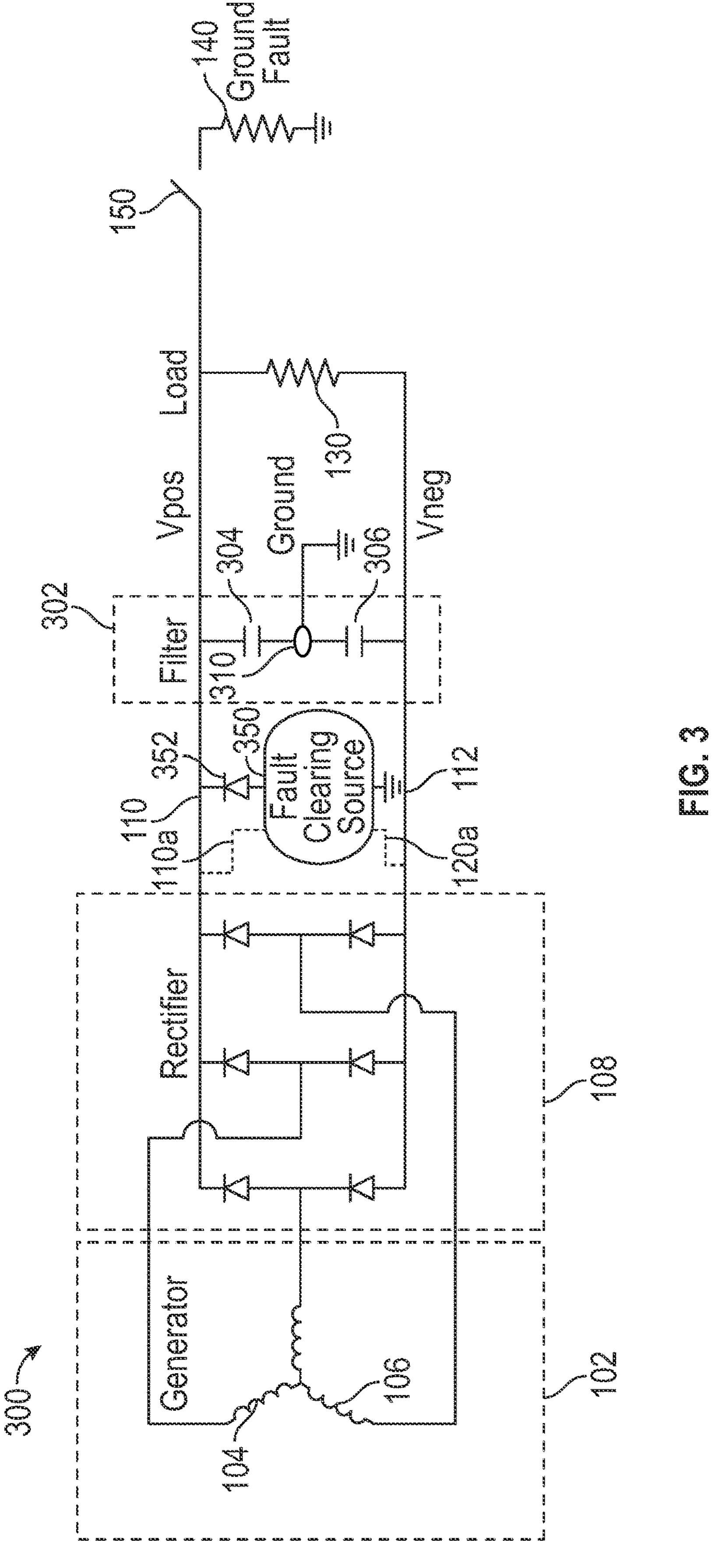
FIG. 3 depicts a system that includes a filter that has its midpoint low impedance grounded and includes a fault clearing source according to one embodiment.

An example of such a system 300 is shown in FIG. 3. The system 300 shown in FIG. 3 includes many of the same elements as the system 100. For completeness, a complete description of the circuit in FIG. 3 is now provided and differences between it and the circuit of FIG. 1 are noted. In particular, the generator DC power generation system 300 includes a generator 102 (generally shown as stator coils 104). In contrast, to FIG. 1, while the coils 104 are connected to one another at a generator neutral 106, the generator neutral 106 is not directly connected to ground.

The generator 102 produces three phase AC power and is connected to a rectifier 108. The rectifier 108 converts the AC power into DC power. The rectifier 108 is shown as a full wave uncontrolled rectifier. A skilled artisan will realize that other types of rectifiers could be utilized in this and other embodiments disclosed herein.

The output of rectifier 108 can generally be described as a DC output and is presented across positive and negative connections 110, 112. The connections can be cables, rails or other means of carrying high voltage power as in FIG. 1 and in FIG. 3 the voltage on these connections is indicated as Vpos and Vneg, respectively.

Similar to FIG. 1, in FIG. 3 the output of the rectifier 108 is connected to an output filter 302 to smooth the output of the rectifier 108 to provide a smoothed or otherwise stable output across positive and negative connections 110, 112. As shown, the filter 302 is implemented by two serially connected output capacitors 304, 306 that are connected across the positive and negative rails 110, 112. The midpoint of the output filter 302 (e.g, where capacitors 304, 306 are connected) is shown by node 310 and is connected to ground to create a midpoint connected output filter. The output capacitors 304, 306 include a first output capacitor 306 connected between connector 110 and ground (e.g., between Vpos and ground) and second output capacitor 304 connected between connector 112 and ground (e.g., between Vneg and ground). The ground is outside of the generator 104 in one embodiment. For example, the ground could be an airframe ground of an aircraft.

While a split capacitor output filter is illustrated, it shall be understood that other types of split filter or split bus configurations are possible to create the midpoint/node 310.

In normal operation, the smoothed output can be provided to a load 130. The load can be any element that needs current to operate. For example, the load can be an aircraft actuator in one embodiment. However, as above, in some instances, one or both of the positive and negative rails 110, 112 can be shorted to ground. That possibility is shown graphically by ground fault connection 140. As shown, the connection is illustrated as a resistor, but it can be thought of as short in some instances. Such a fault can occur when, for example, the connection 110 has its casing or other production damaged and the currently carrying portion of the connection 110 can be directly connected to ground (e.g., to an airframe of an aircraft). As shown, the fault is occurring on the positive rail but could also or in combination, be on the negative rail as well.

The circuit also includes a fault current source 350 that is described in more detail below. As will be more fully understood from the below discussion, the fault current source 350 will provide current when a ground fault occurs to allow the system to clear the fault.

Figures 4A, 4B, 4C, 4D, 4E, 4F:
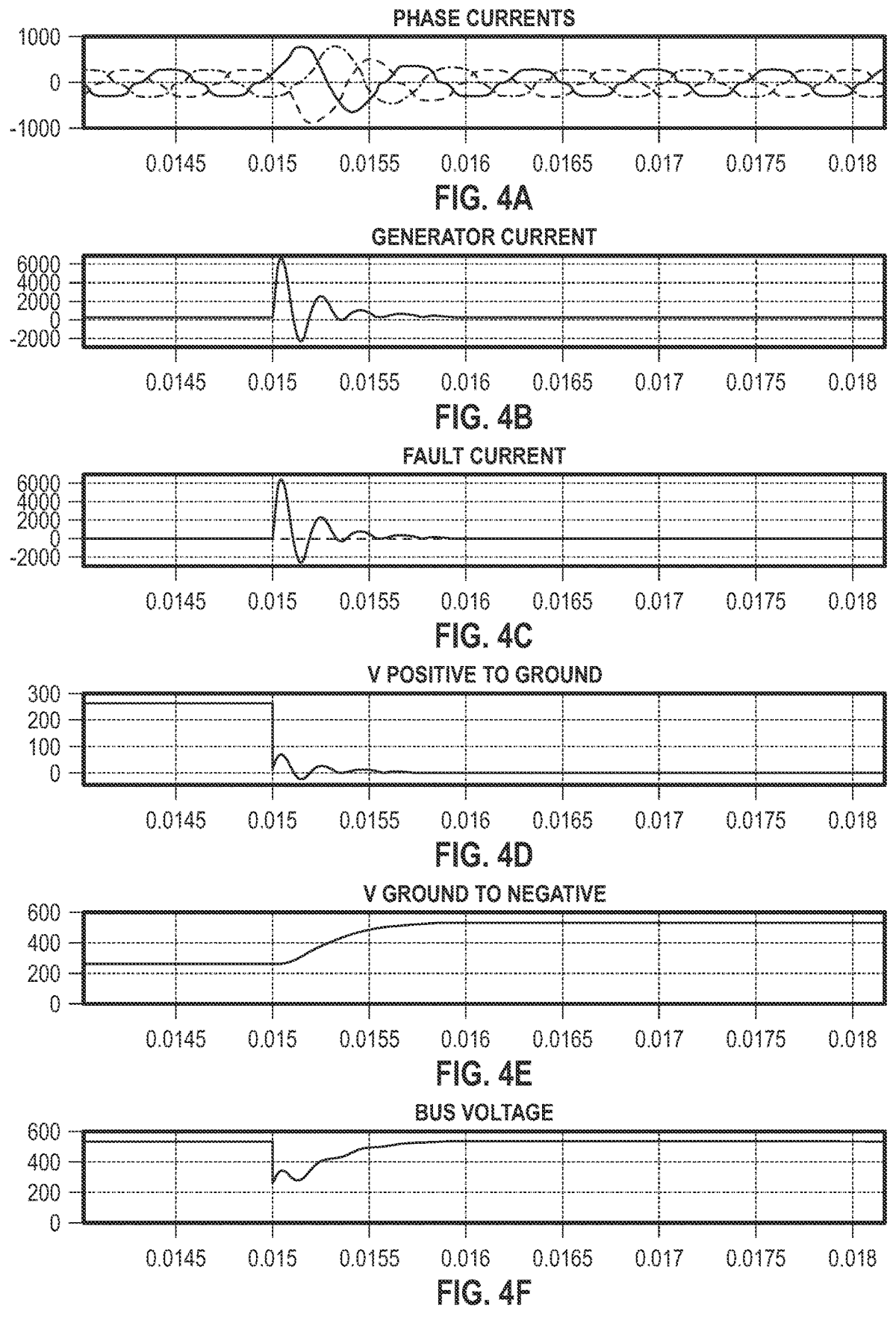

If the fault current source 350 was not present, in the event of a ground fault (e.g., the fault 140 is equivalent to a low impedance connection) the system 300 of FIG. 3 should behave as illustrated in FIGS. 4*a*-4*f*. When the fault 140 is a "short" (in this case, and 0.015 s) it effectively couples connector 110 to ground. This will result in a rapid rise in current through the fault 140 (FIG. 4*c*) and results in a rise in current though the coils (FIG. 4*a*) and the DC current at the output of the rectifier (FIG. 4*b*). The discharge of the shorted capacitor 304 is the source of the dc fault current (FIG. 4*c*). In general, the dc fault current depicted does not contain enough energy to trip a circuit breaker.

As shown in FIGS. 4*c* and 4*d*, the current through the fault and the voltage from connector 110 (Vpos) to ground will eventually fall to zero after a brief current spike through the fault 140. It is noted that the voltage drop is not instantaneous and is dependent on the discharge time of the first output capacitor 304. After that has discharged, Vpos effectively becomes ground for the system. As such, it cannot provide current to the contactor 150 to clear the fault. In more detail, it is assumed that after the fault occurs, the system will meet the required DC voltage transient, voltage ripple and voltage distortion requirements (see FIGS. 4*a*-4*d*). Although this approach can provide a brief surge in the DC current, it is not capable of supplying the sustained current necessary to clear the fault. After the initial current surge, the DC and generator phase currents (FIGS. 4*a*, 4*b*) are similar to the values before the fault.

As stated above, after the fault, Vpos becomes ground and, thus, the entire voltage output of the generator is carried between connector 112 (Vneg) and ground as illustrated in FIG. 4*e* and the bus voltage decreases briefly for the other loads on the bus when the ground fault occurs as shown in FIG. 4*f*. Of particular note, after steady state has been reached, there is no voltage on Vpos that can allow it to provide the required current to clear the fault.

Embodiments herein include providing one or more current sources that can provide current after a ground fault. To that end, in FIG. 3 the system 300 includes a fault clearing source 350 connected to the first connector 110. A current blocking device 352 can be provided between first fault clearing source 350 and the first connector. The current blocking device 352 is illustrated as a diode in FIG. 3 but other elements could be utilized as long as they allow current to flow from the current blocking device 352 into the connector experiencing the fault (here, connector 110).

The fault clearing source 350 could be located at other locations in the system. There could even be multiple fault clearing sources (per rail) to provide redundancy.

Figure 5A:
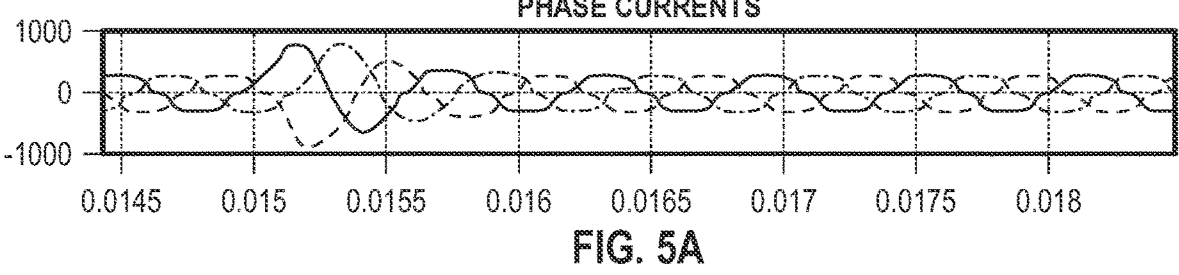
FIGS. 5A-5F show various currents and voltages in the system of FIG. 3 before and after a ground fault occurs in one of the positive DC connectors of the system with the addition of the fault clearing source.
Figure 5B:
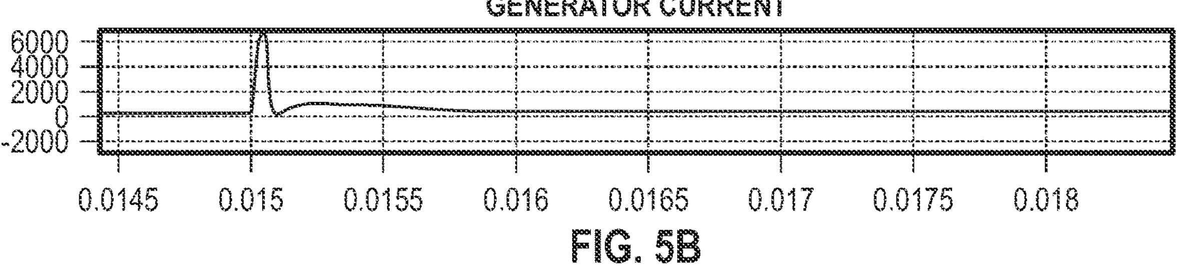
Figure 5C:
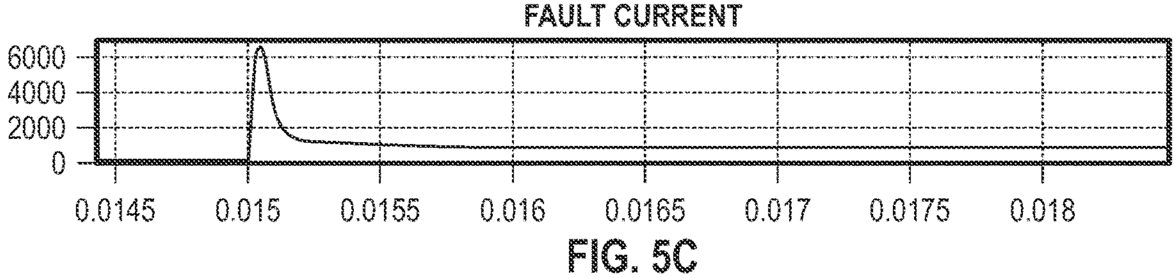
Figure 5D:
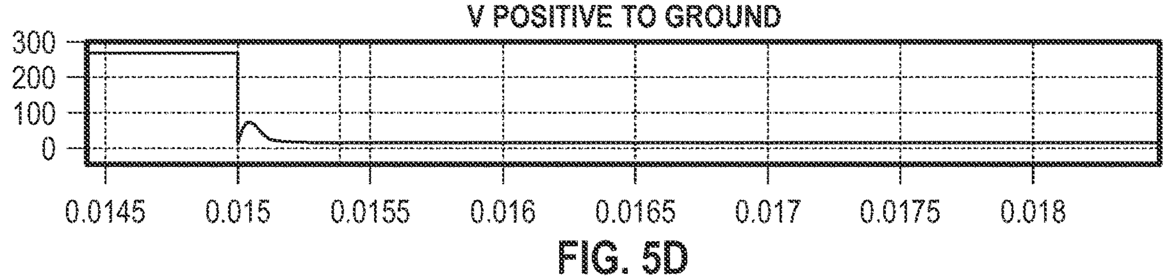
Figure 5E:
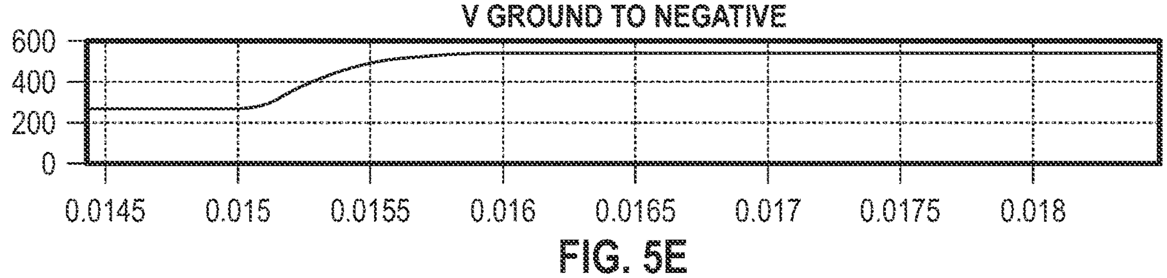
Figure 5F:
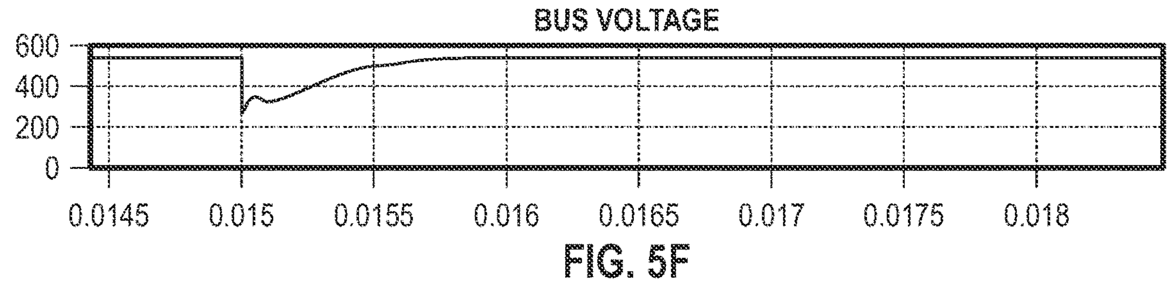

The first fault clearing source 350 can be, for example, a DC power source such as a battery, a DC power source that is connected to one of both connectors 110, 112 or a DC power source connected to other connectors to name but a few. When the fault occurs, the voltage provided by the first fault clearing source 350 will be higher than the voltage on the first connector. As such, this voltage differential will allow for conduction of current through the current blocking device 352 and through the fault 140 allow for clearing of the fault. However, in the absence of fault, the voltage on first connector 110 will be higher than the voltage provided by the first fault clearing source 350. Thus, the current blocking device 352 will not allow current to pass from the first fault clearing source 350 to the first connector 110 and, thus, essentially isolate the first fault clearing source 350 from the first connector. The various voltage/current are shown in FIGS. 5*a*-5*f* for system where the first fault clearing source 350 provides a non-zero fault clearing current after the fault occurs to clear the fault as illustrated in FIG. 5*c*. For simplicity, the fault clearing current reference in 5*c* is short duration as was illustrated in 4*c*. However, the fault clearing source period can be longer to allow the downstream devices (tcb, sspc) to trip. Such times could be from a few seconds to one or more minutes.

As illustrated, the first fault clearing source 350 is connected directly to the anode of the diode utilized as the current blocking device 352 and the cathode of the diode utilized as the current blocking device 352 is directly contacted to the positive connector 110. Other elements could be connected between these elements unless a direct connection is specifically required.

The fault clearing source 350 can provide a voltage of between 10 and 100 and between 10 and 20 volts in one embodiment. As shown, the fault clearing source 350 is connected to both connectors 110, 112. These connections 110*a*, 112*a* are shown in dashed to indicate that either or both is optional. In one embodiment, the fault clearing source 350 is utilized to clear a fault on a specific connector and, thus, receives power from the other conductor.

Figure 6:
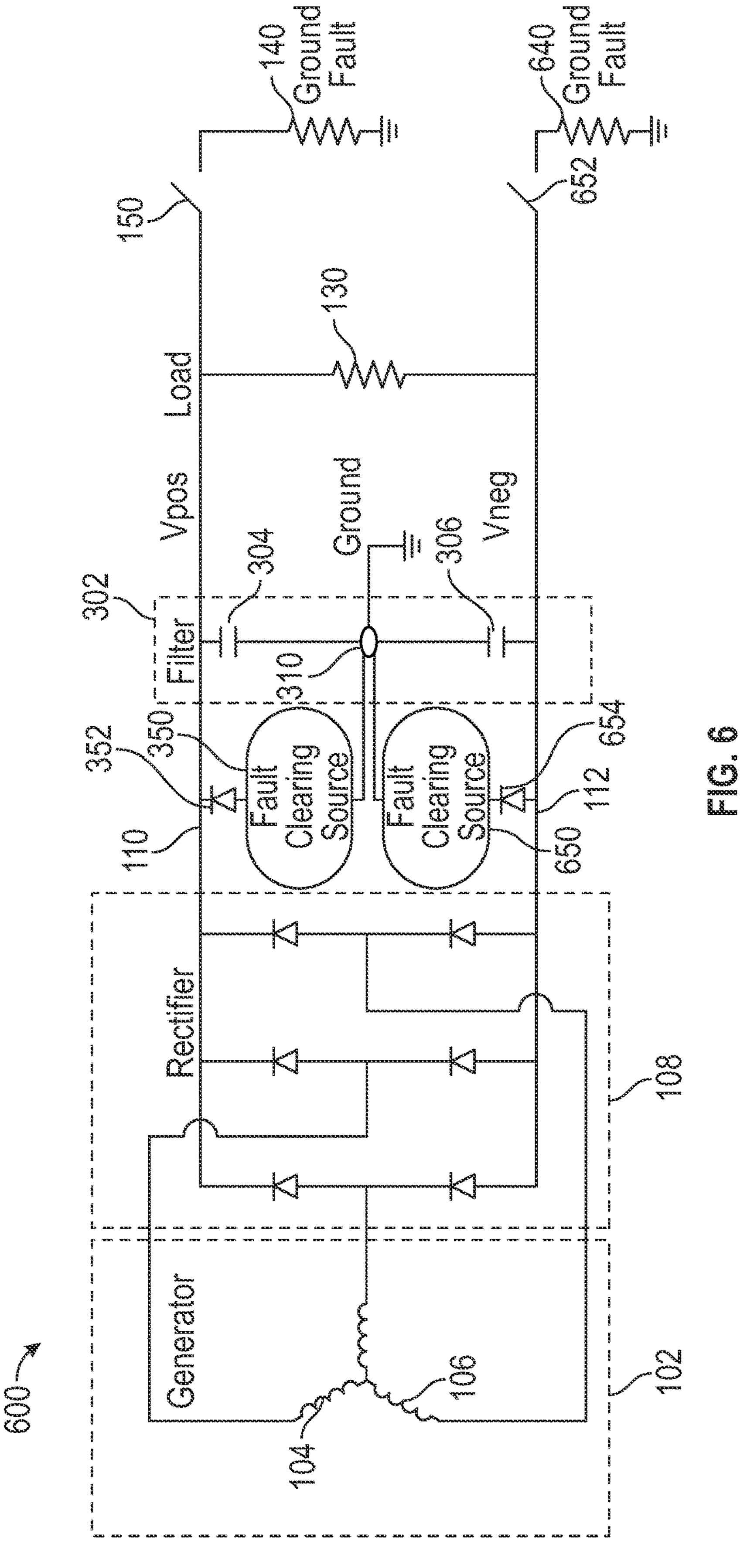
FIG. 6 depicts a system that includes a filter that has its midpoint grounded and includes fault clearing sources connected to each system DC connectors according to one embodiment.

As shown in FIG. 6, the system 600 can include a separate fault clearing source for each connector. In more detail, a first fault clearing source 350 is connected to the first connector 110 to clear a first fault 140 thereon and a second fault clearing source 650 is connected to the second connector 112 to clear a second fault 640 thereon using, for example, contactor 652.

Figure 7A:
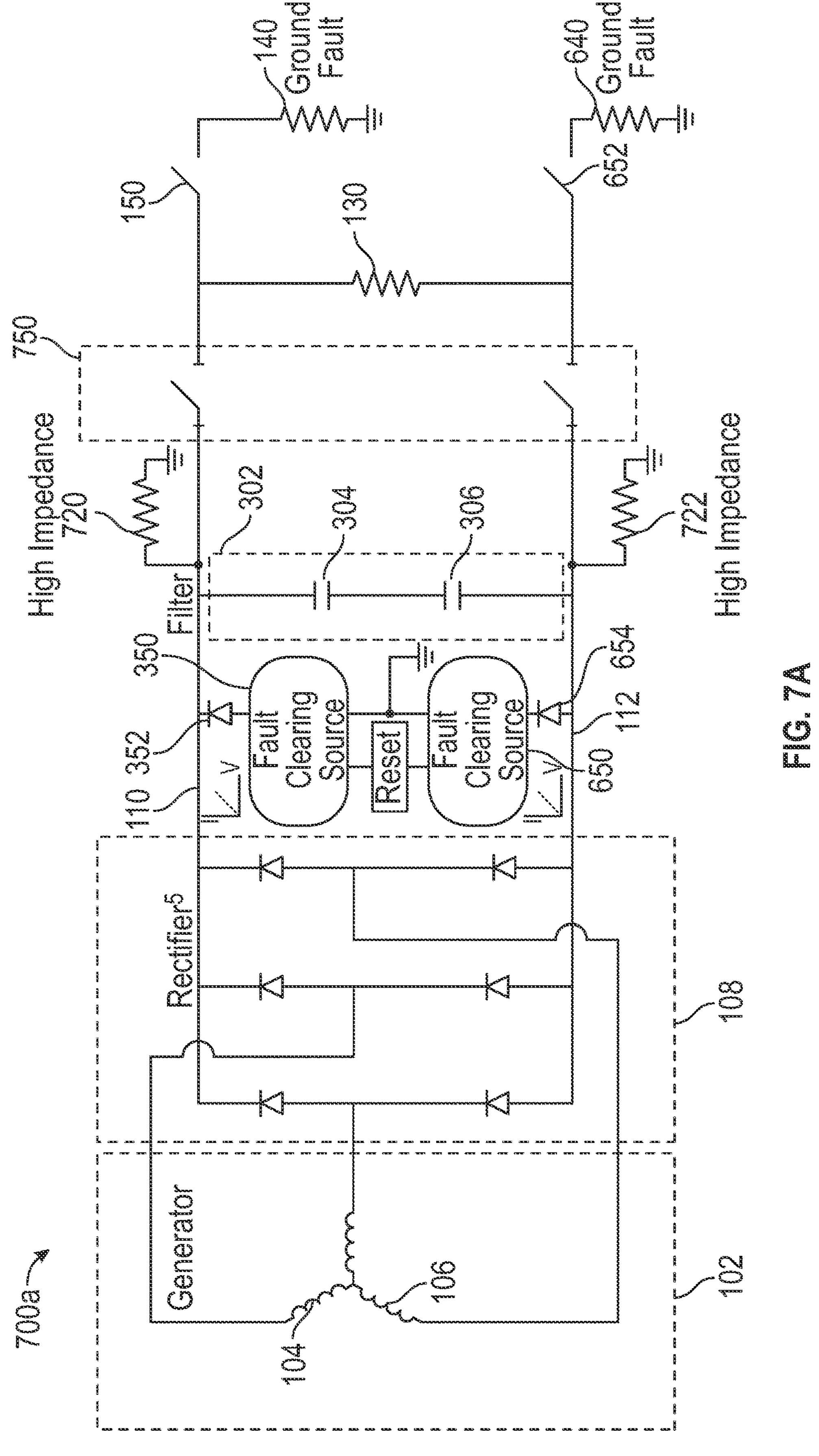
FIGS. 7A-7C show rectifier midpoint high impedance ground systems that include a filter includes fault clearing sources connected to each system DC connectors according to one embodiment.
Figure 7B:
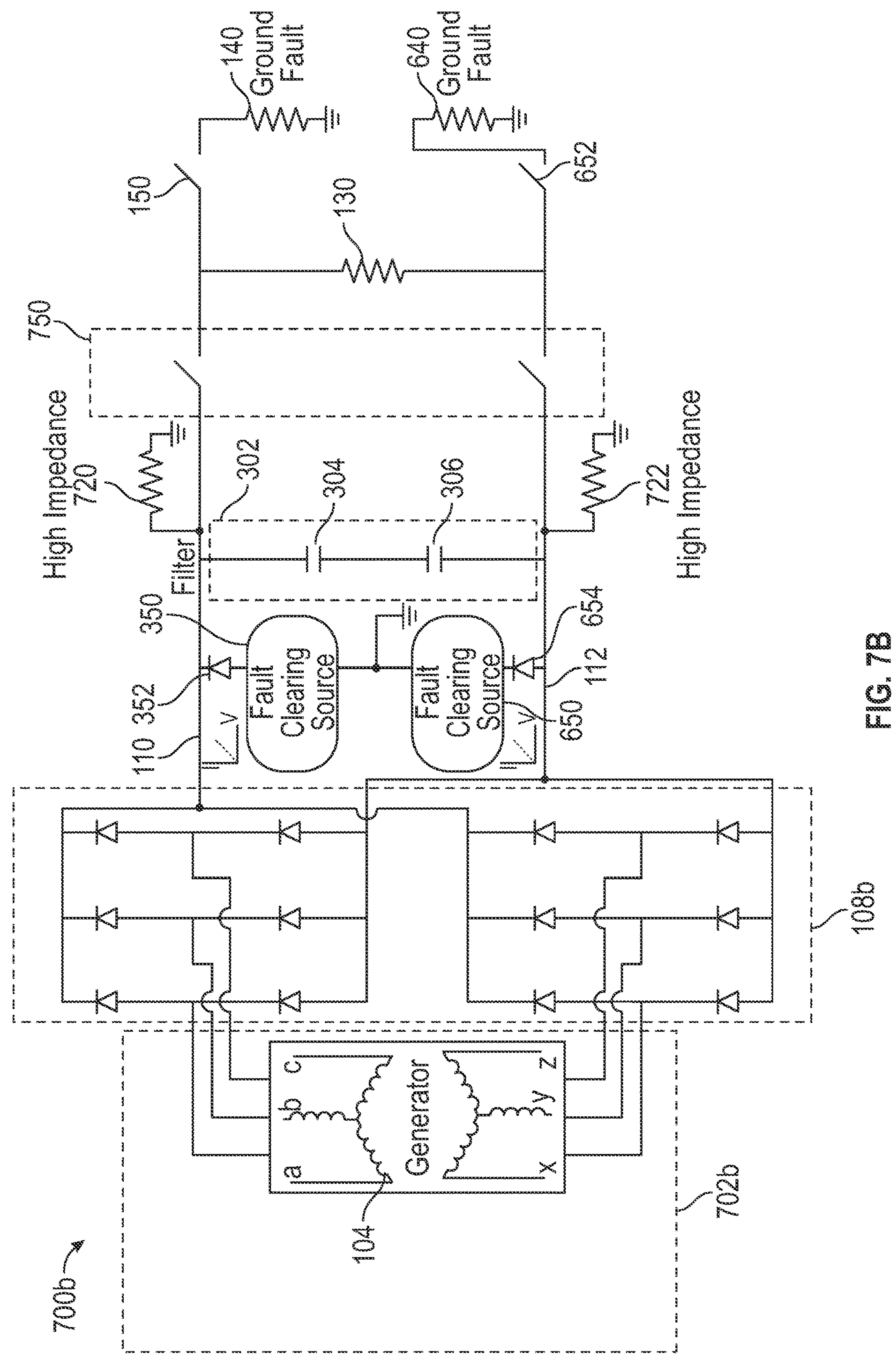
Figure 7C:
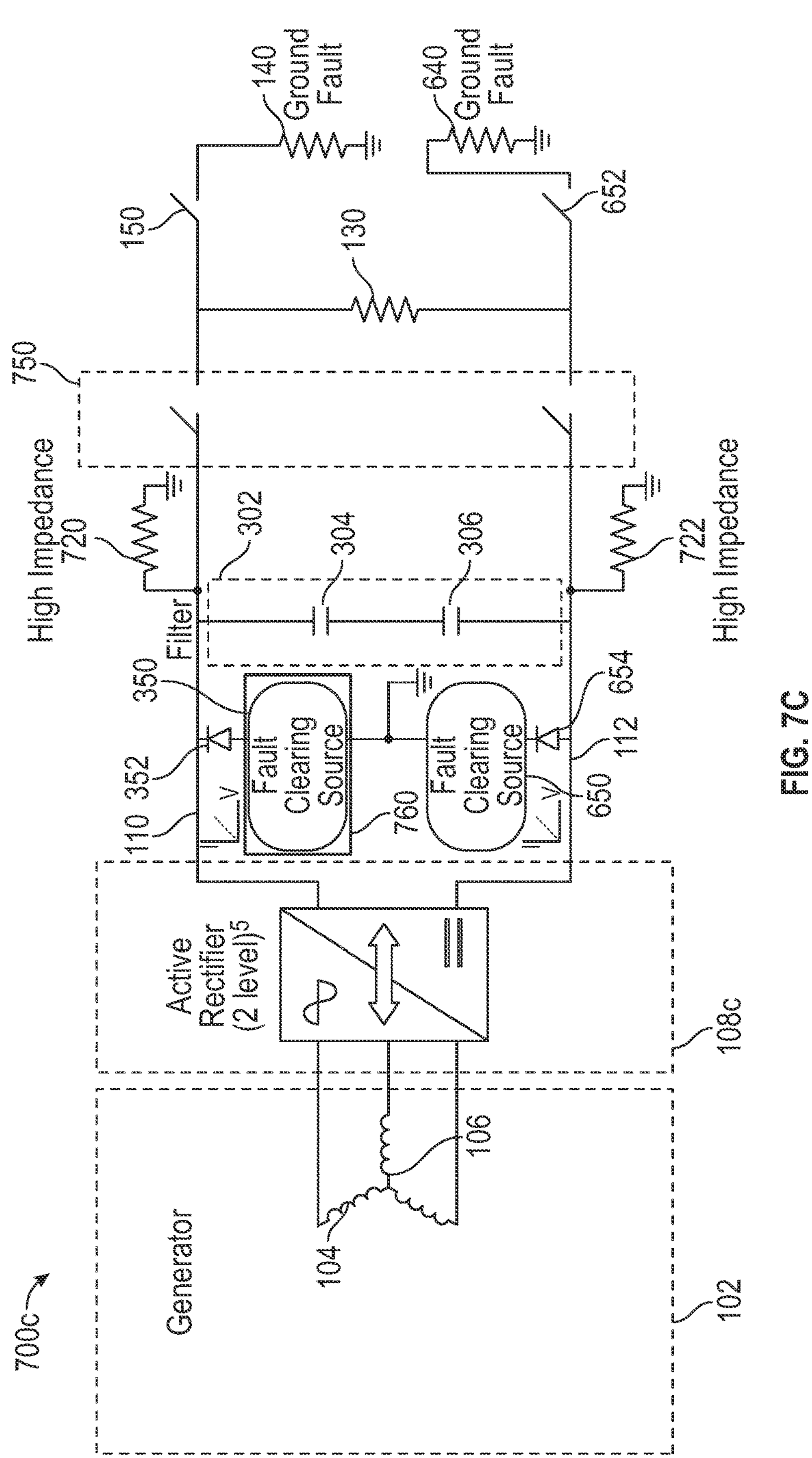

The above description includes systems where the filter 302 is connected to ground between the capacitors 304, 306. As shown with systems 700*a*, 700*b*, 700*c* in FIGS. 7A-7C, the filter 302 could be connected across the positive and negative rails 110, 112 and the fault clearing sources 350,

650 each connected between an adjacent rail and ground (e.g., fault source 305 is connected between rail 110 and ground and fault clearing source 650 is connected between rail 112 and ground. Each fault clearing source 350, 650 can have a diode 352, 654 connected between it and the rail 110, 112 as shown. It shall be understood that while different types of power sources 102, 702*b*, 102 in FIGS. 7A-7C are shown, the power sources can replace the power sources in any embodiment shown herein. For instance, the power source 102 is a floating neutral generator, the power source 702*b* is multi-phase generator that has a twelve pulse passive rectifier 108*b* and the power source 102 of FIG. 7C can be connected to a two-level active rectifier 108*c*. Of course, as desired, the sources and converters can be mixed and, thus, for example, the passive rectifier 108*b* could be a two level active rectifier and vice versa depending on the context.

In cases where the filter is not mid-pointed grounded with a low impedance connection and as shown in FIGS. 7A-7C, each rail 110, 112 can be connected to ground through a high impedance resistor 720, 722. Example voltages of +/−270 Vdc may exist on rails 110, 112. However, other voltages can be used. In any embodiment herein, a fault can be detected by a solid state power controller (SSPC) 750 that cuts power in the event that too much power (current/voltage) is being provided to the load. The SSPC 750 can be included in any embodiment herein.

As shown, the fault clearing sources 350, 650 are indicated to be so-called voltage boosting sources. As in the prior discussion, these sources can provide a base level of voltage to be used when clearing a fault (e.g., 28 Vdc). The fault can result in the SPPC 750 isolating the power sources 102, 702*b* from the load 130 and respective ground fault 140, 640.

For example, the sources could provide a minimum voltage level of 28 Vdc which is an aircraft historical voltage standard. In the event of a fault in the DC electric power systems disclosed herein, the sources 350, 650 can be configured such that they provide an additional integrated voltage boost functionality for high impedance ground faults. For a given clearing current requirement to clear the fault the clearing sources can slightly increase fault source voltage/current output (e.g., above the base level). This can be accomplished, for example, by providing a boost converter in the clearing sources 350, 650.

Consider the case of a rail 110, 112 to ground fault. In such a case, the standard base level may not draw enough current draw under high impedance ground fault conditions. The fault clearing voltage boost function provides a ramping voltage/current to the system ground fault and return via the fault clearing source ground path (e.g., from fault clearing source 350, through the ground fault 140, 640, through fault clearing source-ground return path).

In one embodiment, the SSPC 750 can be configured to detect the fault clearing voltage boost managed drive of sufficient magnitude (potentially in combination with or/without common mode voltage shift/signal injection). This can be done while the contactors 150, 652 are used to supply a ground fault. In such a case post fault isolation, a normal common mode voltage level will resume, enabling electric system recovery and pausing operation of the fault clearing and integrated voltage boost function. Utilization equipment impact during this fault clearing and recovery process is inconsequential, given differential mode voltage stability.

As such, the voltage boost enhancement options slightly increase fault clearing power level (voltage and current) to improve high impedance ground fault detection/correction.

As noted above, in some cases, the fault clearing sources can provide either a static or ramping voltage. In either case, the sources can be current limited. Limiting current can enable reduced fault clearing power level management for low impedance or short circuit ground fault condition operation to limit structure, panel, equipment damage, and reduce human electrical safety risk.

Further, in addition or alternatively, the fault clearing sources can be configured to provide signals with defined/identifiable characteristics (frequency, square wave, sinusoid, pulse, or other distinctive and detectable pattern) to the ground fault. The fault clearing sources 350, 650 with integrated signal injection enhancement functionality can be configured to produce a detectable signal on the system network to expand coordinated protection system fault clearing robustness at a reduced voltage and current level during +/−270 Vdc (or equivalent scaled voltage) rail to ground faults.

In addition, an optional reset switch can be provided in any prior embodiment. Should a fault occur, in some instances, the fault clearing sources 350, 650 can include a latching protection mechanism. The reset can enable recovery clearance functionality (e.g., turns sources 350, 650 back on) based on time, via a pilot or maintenance personnel accessible switch interface (hardware or virtual display style). An automated logic means of protection reset, based on deterministic system conditions (such as ground mode or emergency mode detected conditions), is another possible approach which can be applied.

Figure 8B:
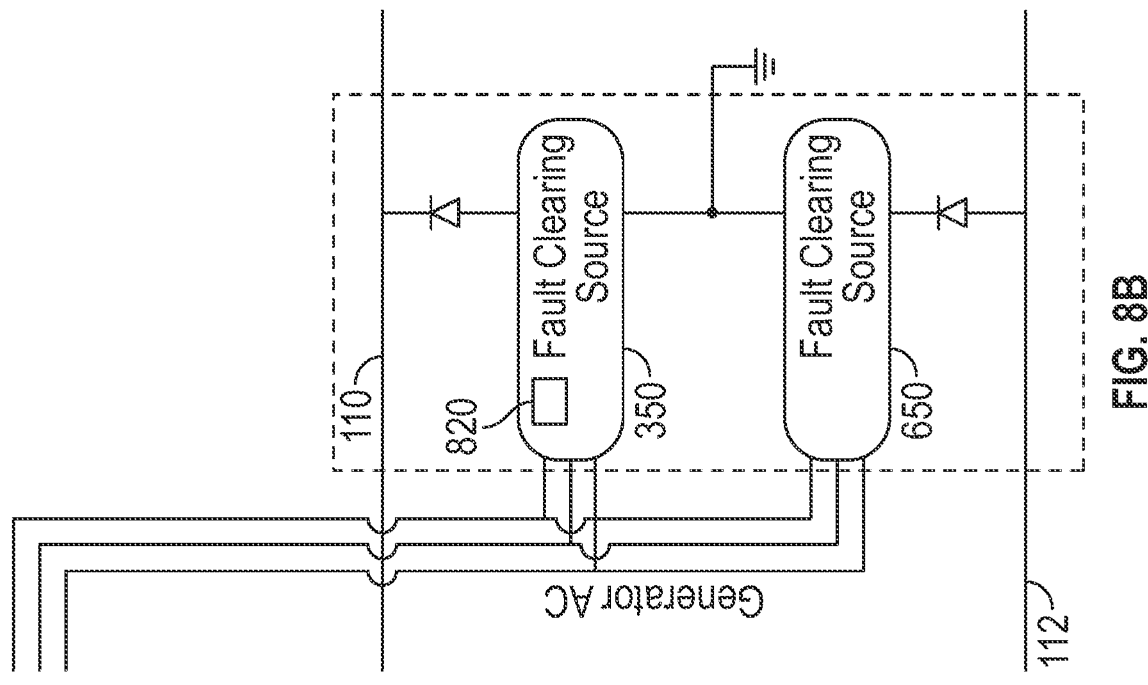
FIGS. 8A-8B show various ways to provide power to the fault clearing sources according to an embodiment.
Figure 8A:
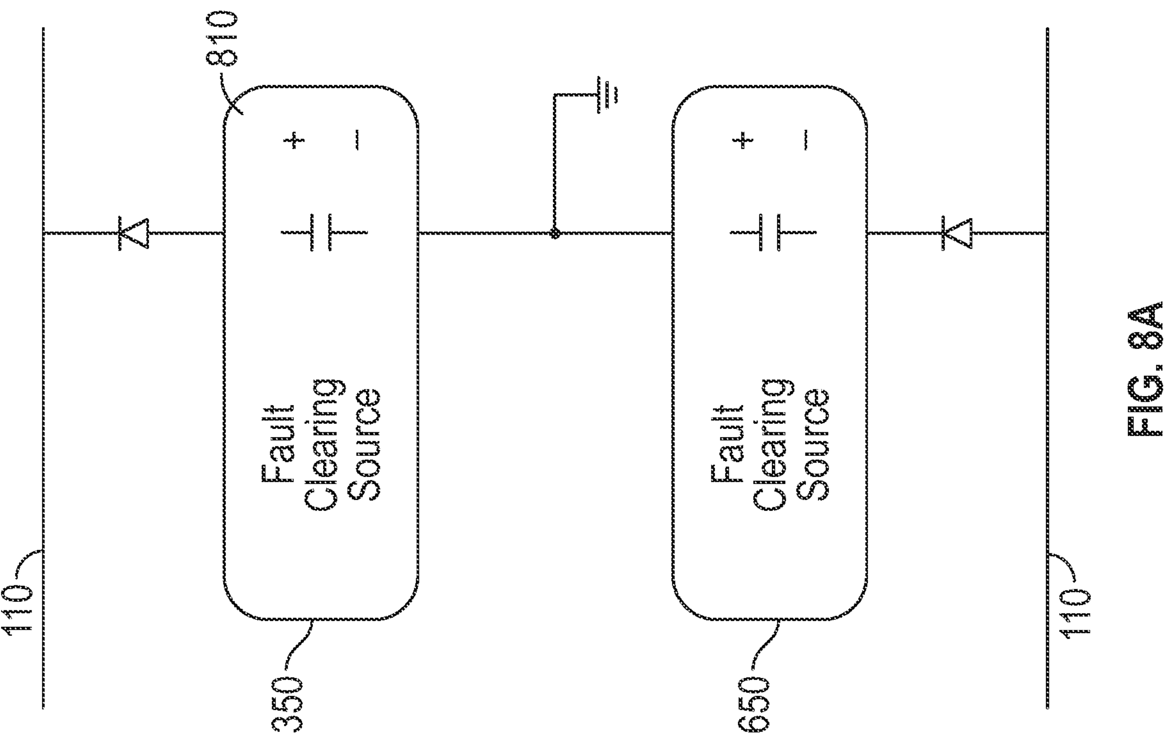

As noted above, the fault clearing sources 350, 650 can include a DC power source such as a battery. In other embodiments, the fault clearing sources 350, 650 can include capacitor 810 charged by the power source (FIG. 8A) or can include a rectifier 820 (FIG. 8B) that converts generator AC power to a DC voltage (which may be stored in a capacitor/battery or other DC storage device or can provide DC in real time). As shown in FIG. 8B the power is 3 phase power could be from any generator shown herein or other generators available in the system/aircraft (e.g., a PMG on an aircraft).

In the prior embodiments, several fault clearing source configurations have been described. Any of configurations could be integrated into a product packaging (e.g., element 750 in FIG. 7A). The packing could be, for example, a federated unit, SPDA chassis card, power district, generator, primary distribution, power conversion, MLC, High Energy Storage Module (HESM)/Battery/Charger/Fuel, Cell, GCU, or as part of current sensing equipment.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A power supply system to provide power to a load connected between first and second connectors, the system comprising:

a power source that produces a power output;

a power converter that configured to receive the power output and convert it into a direct current (DC) output and provides the DC output between the first and second connectors;

a filter connected to the power converter and between the connectors and that is configured to smooth the DC output;

a fault clearing source connected to the first connector that is configured to provide a clearing voltage to the first connector when a ground fault occurs on the first connector; and a switch connected to the first connector configured to open and close to clear the fault while the fault clearing source is providing the clearing voltage to the first connector;

wherein the clearing voltage includes an identifiable characteristic.

2. The power supply system of claim 1, wherein the identifiable characteristic is a frequency, a square wave, a sinusoid, a pulse, or other distinctive and detectable pattern.

3. The power supply system of claim 1, wherein the fault clearing source is a battery.

4. The power supply system of claim 1, wherein the fault clearing source receives power from the second connector.

5. The power supply system of claim 1, wherein the power source is an AC generator and the power converter is a rectifier configured to receive the AC power from the generator and converts it into a direct current output and provide the DC output between the first and second connectors.

6. The power supply of claim 5, wherein the rectifier is a two stage active rectifier.

7. The power supply system of claim 1, further comprising:

wherein the switch is a contactor.

8. The power supply system of claim 1, wherein the fault clearing source is connected between the first connector and a ground.

9. The power supply system of claim 8, wherein the ground is an airframe ground.

10. A power supply system to provide power to a load connected between first and second connectors, the system comprising:

a power source that produces a power output;

a power converter configured to receive the power output, convert it into a direct current (DC) output and provide the DC output between the first and second connectors;

a filter connected to the power converter and between the connectors configured to smooth the DC output; and a first fault clearing source connected to the first connector configured to provide a first clearing voltage to the first connector when a first ground fault occurs on the first connector;

a second fault clearing source connected to the second connector configured to provide a second clearing voltage to the second connector when a ground fault occurs on the second connector; and a switch connected to the first connector configured to open and close to clear the fault while the fault clearing source is providing the clearing voltage to the first connector;

wherein at least one of the first and second clearing voltages includes an identifiable characteristic.

11. The power supply system of claim 10, wherein the identifiable characteristic is a frequency, a square wave, a sinusoid, a pulse, or other distinctive and detectable pattern.

12. The power supply system of claim 10, wherein the first and second fault clearing sources are batteries.

13. The power supply system of claim 10, wherein the first fault clearing source receives power from the second connector and the second fault clearing source receives power from the first connector.

14. The power supply system of claim 10, wherein the power source is an AC generator and the power converter is a rectifier configured to receive the AC power from the generator and converts it into a direct current output and provide the direct current (DC) output between the first and second connectors.

15. The power supply of claim 14, wherein the rectifier is a two stage active rectifier.

16. The power supply system of claim 10, wherein the first fault clearing source is connected between the first connector and a ground and the second fault clearing source is connected between the second connector and the ground.

17. The power supply system of claim 16, wherein the ground is an airframe ground.

18. A power supply system to provide power to a load connected between first and second connectors, the system comprising:

a power source that produces a power output;

a power converter that configured to receive the power output and convert it into a direct current (DC) output and provides the DC output between the first and second connectors;

a filter connected to the power converter and between the connectors and that is configured to smooth the DC output;

a fault clearing source connected to the first connector that is configured to provide a clearing voltage to the first connector when a ground fault occurs on the first connector; and a contactor connected to the first connector configured to open and close to clear the fault while the fault clearing source is providing the clearing voltage to the first connector;

wherein the clearing voltage includes an identifiable characteristic.

19. The power supply system of claim 10, wherein the switch is a contactor.

* * * * *